Figure 8:
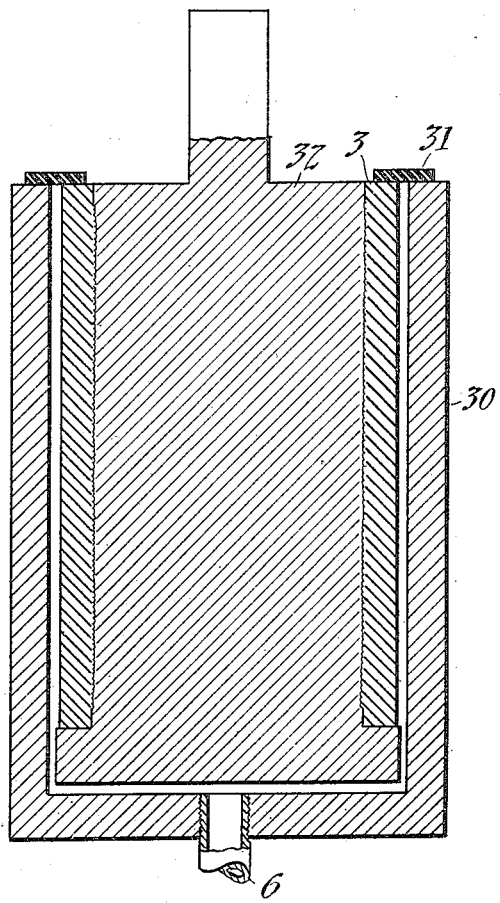

J. W. AYLSWORTH.
PROCESS OF MANUFACTURING SOUND RECORDS.
APPLICATION FILED APR. 1, 1909.
1,036,416.
Patented Aug. 20, 1912.
4 SHEETS—SHEET 1.
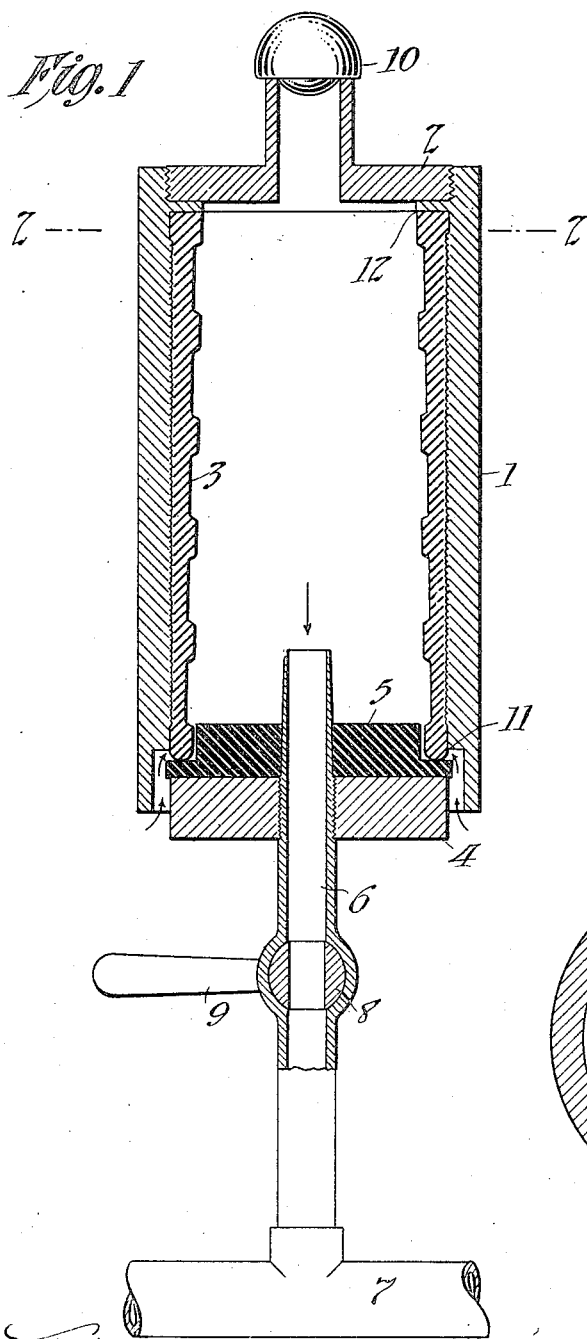
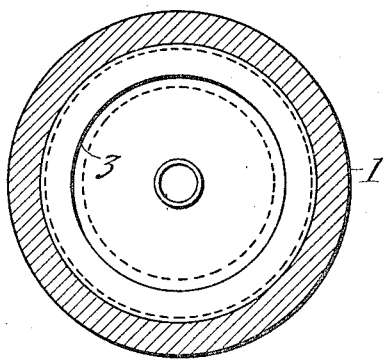

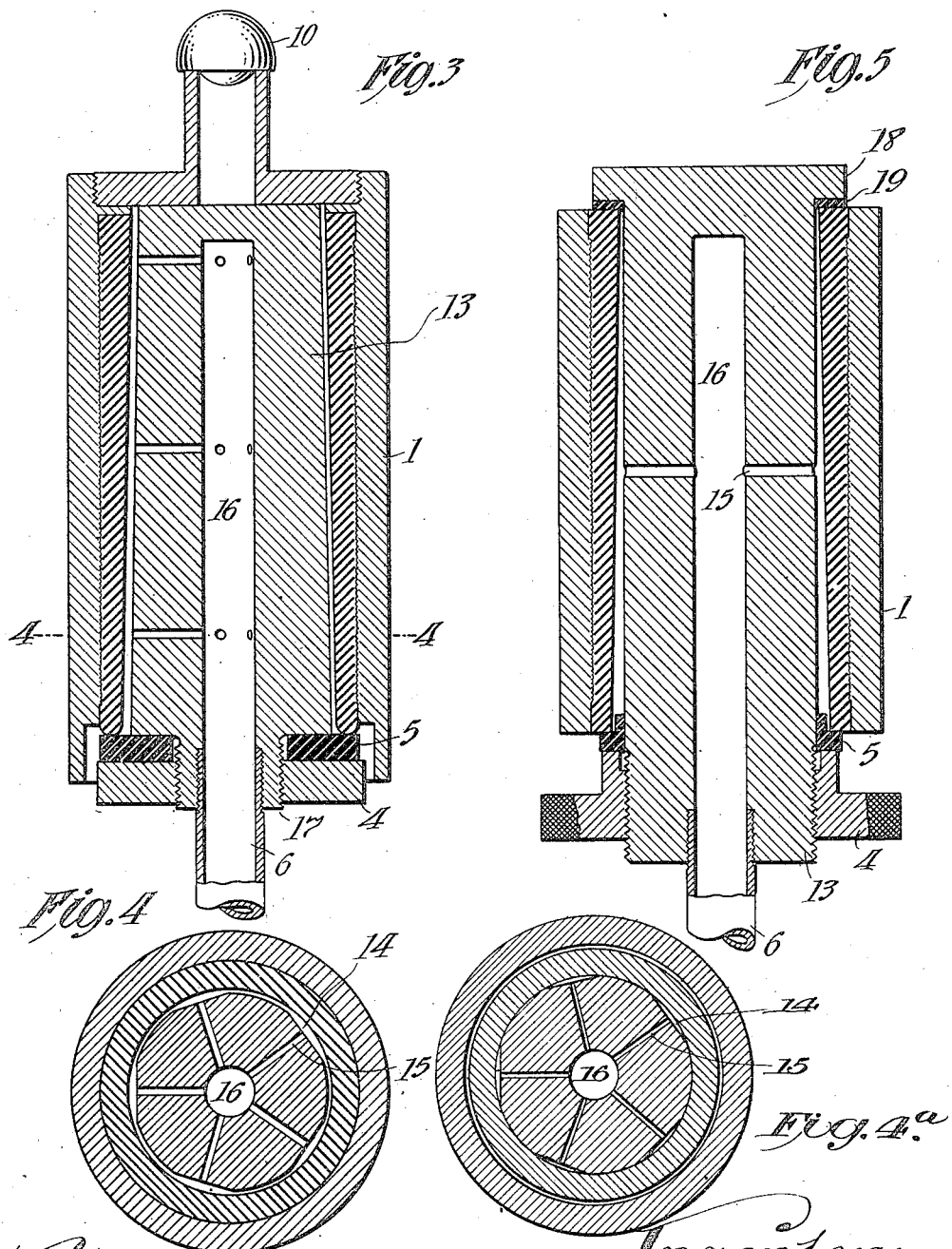

J. W. AYLSWORTH.
PROCESS OF MANUFACTURING SOUND RECORDS.
APPLICATION FILED APR. 1, 1909.
1,036,416.
Patented Aug. 20, 1912.
4 SHEETS—SHEET 3.
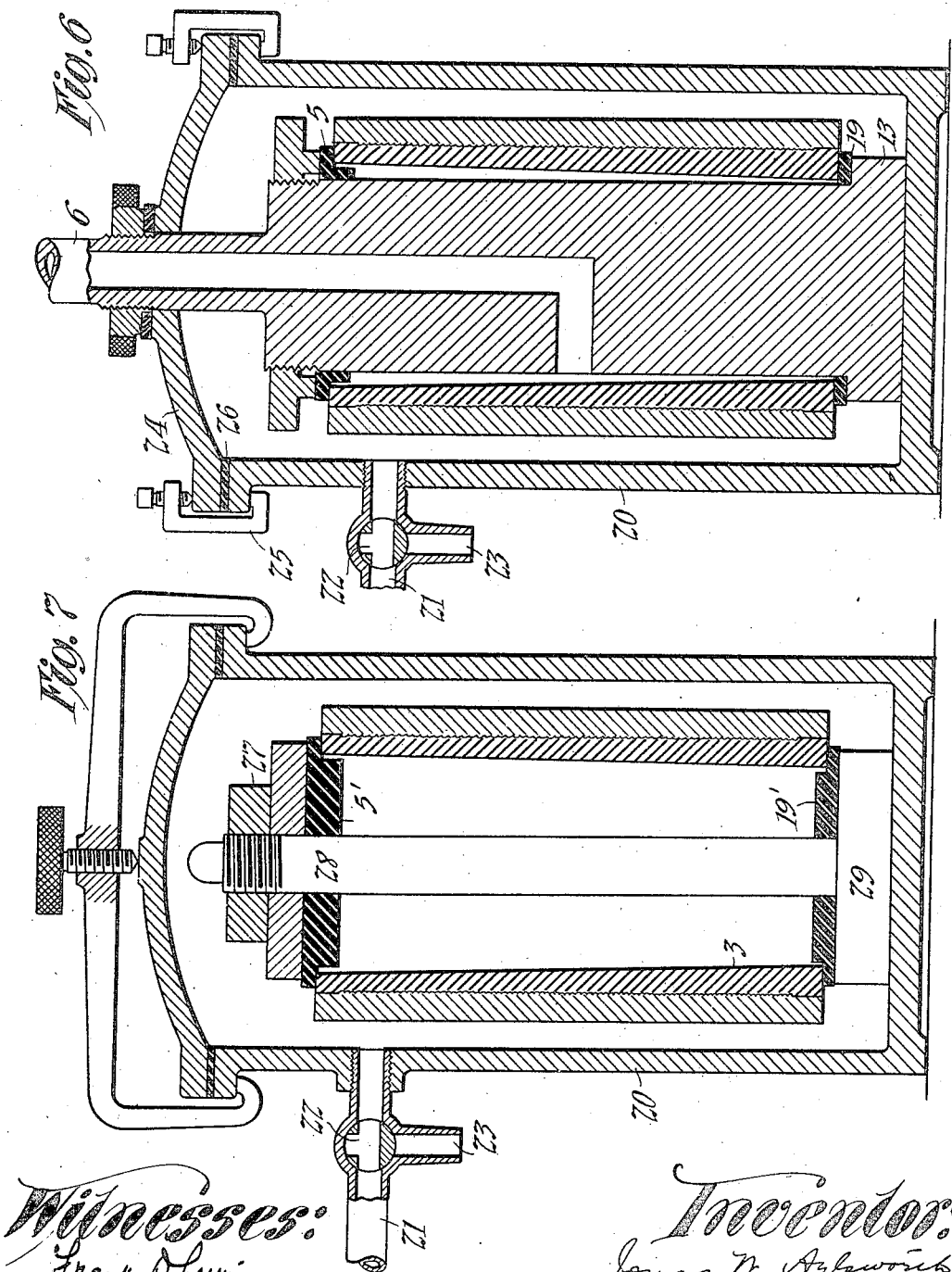

J. W. AYLSWORTH.
PROCESS OF MANUFACTURING SOUND RECORDS.
APPLICATION FILED APR. 1, 1909.

1,036,416.

Patented Aug. 20, 1912.
4 SHEETS—SHEET 4.

UNITED STATES PATENT OFFICE.

JONAS W. AYLSWORTH, OF EAST ORANGE, NEW JERSEY, ASSIGNOR, BY MESNE ASSIGNMENTS, TO THOMAS A. EDISON, INCORPORATED, OF WEST ORANGE, NEW JERSEY, A CORPORATION OF NEW JERSEY.

PROCESS OF MANUFACTURING SOUND-RECORDS.

1,036,416.	Specification of Letters Patent.	Patented Aug. 20, 1912.

Application filed April 1, 1909. Serial No. 487,360.

*To all whom it may concern:*

Be it known that I, JONAS W. AYLSWORTH, a citizen of the United States, and a resident of East Orange, county of Essex, and State of New Jersey, have made a certain new and useful Invention in Processes of Manufacturing Sound-Records, of which the following is a specification.

My invention relates to the molding art and to methods of removing a cast from its matrix, and more particularly where the cast is a molded sound record.

The object of the invention is to secure a method of removing a cast from its matrix by means other than contraction of the cast due to cooling or solidification of the cast.

By means of my invention many useful substances may readily be molded by any of the methods well known in the molding art into a great variety of objects and forms, which result could only be attained with great difficulty and in many cases not at all, before my invention.

The invention is described in detail in this specification in connection with only one line of manufacture, namely, in connection with the art of molding sound records. It is, however, obvious that the same may be utilized in a great variety of manufactures with a large number of substances to produce in an efficacious manner casts which were impossible, or difficult, if possible, before my invention.

In the art of molding sound records, as practised, the records or phonograms are either cast by pressing certain substances, which become plastic by heating into metallic matrices, or by pouring a molten substance into the matrix, or dipping the matrix into the molten substance, and allowing the substance to solidify and contract sufficiently for the same to be removed from the matrix, or by molding a substance which is rendered fluid or plastic by a solvent and solidifying the same by evaporation, or by chemical means and depending on the shrinkage of the substance to remove it from the matrix. In these processes, the shrinkage of the material due to the lowering of the temperature of the same, is depended upon to clear the cast from the surfaces of the matrix, which would otherwise lock the same, the cast being withdrawn from the matrix when this cooling and shrinkage have proceeded for a sufficiently long time to make such removal possible. In my present invention, absolutely no dependence is placed on shrinkage or contraction due to forces acting within the substances because of change of temperature or otherwise, the contraction or movement of the cast necessary to remove the same in my present invention being furnished entirely by external forces. Briefly and more specifically, my invention provides for the removal of a cast from its matrix by creating a difference in pressure between the two surfaces of the cast in the mold while the cast is still in a somewhat plastic condition, the pressure on the surface of the cast in contact with the mold being the greater. This result can be attained either by applying a suction or drawing force to the surface of the cast out of contact with the mold surface, or by applying pressure, as that of air or other fluid, to the surface of the cast in contact with the mold, or by a combination of these two agencies. By such means, a more rapid extraction of the cast is possible and a greater contraction may be caused to occur, when contraction is desired, than would result from the contraction due to the shrinkage of the material cast. Also, the contraction is of such a nature that it may be controlled to a large extent. It should likewise be noted that when it is desirable to expand rather than contract the cast to extract it from the mold, this may be accomplished without difficulty by my invention. The art is furthermore extended in that it is practicable by this method to make sound records of a variety of permanent substances, such as glass, metal, rubber compositions, shellac compositions, gums, gelatin, casein, cellulose esters, condensation products of aldehydes and phenyls and other radicals, none of which lend themselves readily to the art of molding sound records, on account of the difficulty of removing them from the matrix.

It will, of course, be obvious that the invention may be practised not only in the case of sound records, but wherever the casting of a substance in a mold is rendered impracticable because of the difficulty of removing the cast from the mold, on account of the fact that the surfaces of the mold interlock with the substance cast therein or projected in the path thereof.

The invention may be practised in a number of ways, a few of which will be described in connection with the accompanying drawings, forming part of this specification, and in which—

Figure 9:
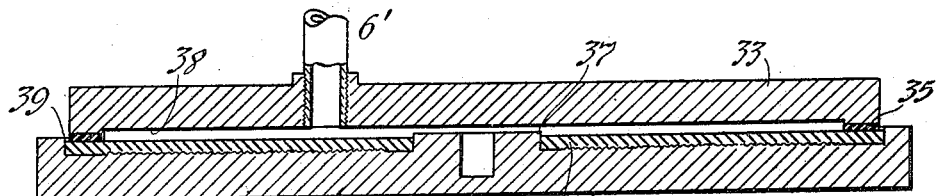

Figure 1 is a vertical elevation, partly in section, showing one means of removing a phonograph record from its surrounding cylindrical mold for the purpose of extracting the record. Fig. 2 is a section on line 2—2 of Fig. 1. Fig. 3 is a vertical section through apparatus for contracting or collapsing a cylindrical sound record from its surrounding mold, a hollow mandrel being used. Fig. 4 is a horizontal section on line 4—4 of Fig. 3. Fig. 4a is a view similar to Fig. 4 showing the sound record shrunk into contact with the hollow mandrel. Fig. 5 is a vertical central section through still another apparatus for effecting the same result in connection with a hollow mandrel. Fig. 6 is a sectional view of apparatus for contracting or removing a cylindrical sound record from its surrounding matrix, showing a method of utilizing fluid pressure on the surface of the record in contact with the mold surface, and also suction on the inner surface or that surface of the record out of contact with the mold surface. Fig. 7 is a sectional view through apparatus in which the force of the fluid under pressure, which is to be applied to force the record out of contact with the mold surface, alone is used. Fig. 8 is a vertical sectional view showing the application of the same principle to the case in which it is desired to expand a cylindrical cast away from contact with a core or molded matrix. Fig. 9 is a vertical section through apparatus for applying the process to the removal of disk sound records from the matrix whereby the same are formed.

Referring to the drawings, the process of extracting cylindrical sound records from a surrounding mold is best carried out with the apparatus shown in Figs. 1 and 2. In Fig. 1 a cylindrical mold 1 is provided at one end with the usual cap 2. The sound record 3 is cast in contact with the record on the bore of the matrix 1 by any of the now well known methods of casting records. While the record is still somewhat warm and plastic, the mold containing the record is placed in contact with the plug 4. The plug 4 is provided with a gasket 5 of rubber or other yielding material, which forms an airtight seal when engaged with the end of the record cast. The end of pipe connection 6 protrudes within the bore of the record 3 when the record and mold are placed in position on the plug 4. The pipe 6 is connected as by the connection 7 with a vacuum chamber or pump or other means for exhausting air, pipe 6 being provided with a valve 8 of any suitable design, which can be controlled as by means of handle 9. When the matrix containing the cast record is placed in contact with the plug 4, the weight of the record in contact with the yielding gasket 5 produces an effective sealing of the chamber within the bore of the record at one end, the other end of the chamber so formed being sealed by means of a yielding elastic ball or disk 10, which engages the outlet of the cap 2 of the matrix. When the record and mold are so placed in position, the operator opens valve 8 by lever 9, whereupon a strong suction is immediately caused over the whole of the bore of the record 3. This almost immediately causes the record to withdraw somewhat from the surface of the mold. The result of this is to make a small opening for the outside atmospheric air between the outer periphery of the record 3 and the bore of the matrix, the air rushing into the annular space so caused at the lower end of the matrix, as is indicated at 11. As the pressure within the bore of the record is now below atmospheric pressure, the air rushing in between the record and the matrix forces its way in a thin annular film between the record and the surrounding matrix until it reaches the other end of the cylinder. If the mold is left in position on the plug 4 the outside air will enter the interior of the record at the upper edge 12, equalizing the pressures on the two surfaces of the record. The latter will now have been sufficiently detached from the record surface of the mold to permit the safe and easy removal of the record from the mold by a direct longitudinal movement of the former. The operation is prevented from collapsing the record to such an extent as to damage the same, by the fact that the film or sleeve of air reaches the other end of the mold and passes within the record, as above noted, equalizing the pressure between the interior and the exterior of the record cylinder. This condition allows the ball stopper 10 to drop off, which serves as a notice that the record is loose and ready to be removed. In practice, however, it is usually not necessary to wait for this signal. The operation consumes but a few seconds, thereby effecting a tremendous saving in time over the processes of removing the record from its matrix by the natural shrinkage of the material comprising the record, as heretofore practised. The process works equally well on records which are reamed with a smooth bore or with concentric ribs, a record of the latter type being illustrated in Fig. 1.

The process in no way is the result of a change of temperature of the record or of any save the external forces applied uniformly to the surfaces of the record while the latter is still warm and somewhat plastic. The result is to cause the record to take up a new position, all the elements of the record in this position being parallel to those they occupied in the old position. It is probable that some slight thickening of the record results from the application of the process, and possibly some compression, in the case of a cylindrical record which is removed inwardly from a surrounding mold.

In Figs. 3 and 4, a form of apparatus is illustrated for removing a cylindrical cast from a matrix by means of the entrance of atmospheric pressure between the bore of the matrix and the record surface of the cast, and the exhaustion of air from the interior of the record cylinder, a flattened core being placed within the bore of the record cast. This results in sufficient reduction in circumference of the record to permit its easy removal. This process and the one illustrated in Figs. 1 and 2 may be used on wax-like compositions, and such substances as are easily detached with a moderate force. Referring to Figs. 3 and 4, the mandrel 13 is provided with surfaces which are flattened to a greater or less extent, as indicated at 14 in Fig. 4, the space thus caused at 14 being connected by ducts 15 with the central longitudinal passage 16, which connects by the pipe 6 with the vacuum chamber or suction pump. The pipe 6 is inserted within the central bore of the mandrel as by the threaded connection shown. The mandrel 13 is provided with a threaded portion of reduced diameter 17 on which the plug 4 is adapted to be screwed. The mold containing the record is placed in position with the lower end of the record engaging the upper surface of the yielding gasket 5, the plug 4 then being screwed on the shoulder 17 of the mandrel until the parts are engaged tightly in position. The pipe 6 is then connected with the suction pump, whereupon atmospheric air enters between the outer surface of the mold and the bore of the matrix to strip the record from the mold and force the same inwardly into contact with the flattened core, as shown in Fig. 4ª. The core and record can now be removed together by a longitudinal movement. If a flattened core is used, the flattened portion should not be cut so deeply as to result in distorting the record.

Fig. 5 illustrates apparatus which may advantageously be used in carrying out the process when the cast is more difficult to remove, full atmospheric pressure being allowed to exert itself in this structure to force the record from the mold. As illustrated, a hollow core is used having ducts 15 connected with the space between the bore of the record and the outer surface of the mandrel whereby suction within the bore of the record may be created as in the device shown in Fig. 3. In this device, however, there is no passageway whereby the outer air, which is allowed to enter between the bore of the mold and the outer surface of the record to strip the same is allowed to pass within the bore of the record to equalize the pressures between the two surfaces when the film is extended from one end of the mold to the other, as was explained to be the case in the apparatus previously described. In the device shown in Fig. 5, the plug 4 is screwed into position on the lower end of the mandrel 13 to tightly clamp the record in position between the plug 4 at one end of the record and the shoulder 18 formed on the opposite end of mandrel 13. Yielding gasket 19 is secured between shoulder 18 of the mandrel and one end of the record 3, the gasket 5 being likewise tightly secured between the other end of the record and the plug 4 by which means the passage of atmospheric air to the space within the bore of the record is prevented. When a partial vacuum is created within the bore of the record, the record is withdrawn to some extent from the bore of the mold, allowing atmospheric air to rush into the space thus formed between the record and the mold from both ends of the mold, and the operation may be continued until the record has been sufficiently detached.

Figs. 6 and 7 illustrate different apparatus which may be used when the cast is still more difficult to remove from the matrix. It is obvious that with the application of fluid pressure, an unlimited force may be exerted to force the record out of contact with the mold surface. Apparatus of this sort is disclosed in these figures, which would be applicable, for example, with metal casts. The mold is secured in position by any suitable means within a chamber constructed to withstand the pressure of the compressed air or other fluid used. The fluid under pressure may be allowed to enter pressure chamber 20 by means of pipe 21, which may be provided with a three-way valve 22 and a blow-off connection 23. In Fig. 6 the record is shown as secured between gaskets 5 and 19 on mandrel 13, as was disclosed in connection with Fig. 5, the pipe 6 being connected with a suction pump or the like to create a partial vacuum within the bore of the record, as was described in connection with Fig. 5. Chamber 20 is tightly sealed by any suitable means as by the cover 24, which is securely mounted upon a flange on one end of the chamber 20, as by clamps 25, the yielding gasket 26 sealing the joint. In the apparatus shown in Fig. 7, there is no connection for creating a vacuum within the bore of the cast, entire reliance being placed upon the fluid pressure. In both cases, on turning the valve 22 to the position shown in the drawings, compressed air or other fluid under pressure will rush within the chamber 20, and finding its way between the bore of the matrix and the outer periphery of the record, progress in a sleeve or film from one end of the other to the same, forcing the mold inward to an extent sufficient to detach the record from the mold surface. In the apparatus shown in Fig. 7, the record 3 is secured in position between yielding gaskets 5' and 19' as by tightly turning the nut 27 on bolt 28, which is secured to one end of the chamber 20.

Fig. 8 illustrates the application of the process to the case in which it is desired to separate the cast from the matrix by the expansion of the cast out of contact with the surface of the matrix, this, of course, being the reverse process to that previously described. That is, in case a cylinder, for example, has been molded with the record in negative on its bore as by forming the same in contact with the outer surface of the core or matrix molded with the sound record in positive on the outer surface of the same. In this case, the vacuum connection 6 connects with the space between the outer periphery of the record 3 and the inner surface of the containing cylinder 30. A yielding gasket 31 may be placed on the upper surface of the cylinder 30 and the record 3 to cover the space between the outer surface of the record and the inner surface of the cylinder 30 to prevent the rush of air into the same. In this case the molded core or matrix 32 takes the place of the mold 1 of the previous figures, the outer cylinder 30 corresponding to the mandrel 13, the suction produced by opening the vacuum connection 6 drawing the record 3 outwardly out of contact with core 32 and allowing atmospheric air to rush in between the outer surface of core 32 and the inner molded surface of the record 3, the air rushing downwardly in a thin film to strip the record outwardly out of contact with the record surface of the molded core.

Fig. 9 shows the application of the process in the manufacture of disk sound records. The plug 33 is provided with a yielding bearing on the circumference of the cast disk record 34, as by means of the yielding gasket 35, and if desired, the plug 33 may rest on the center of the matrix 36 at the central boss or enlargement 37 of the matrix. Air is exhausted from the space 38 formed between the matrix 36 and the plug 33, as by means of pipe 6', which may be connected to suitable suction apparatus. This suction results in withdrawing the cast disk out of contact with matrix 36 sufficiently to allow the inrush of the atmospheric air at the circumference 39 of the record between the molded surface of the record and the matrix 36. This detaches the cast record fully from the surface of the matrix 36. If necessary, this atmospheric pressure may be augmented by compressed fluid pressure in cases where the nature of the cast is such that greater pressure is required to detach it from the matrix.

Having now described my invention, what I claim and desire to secure by Letters Patent of the United States, is as follows:

1. The process of extracting phonograph records from a mold consisting in creating for a suitable time interval a difference in pressure between the two surfaces of the record in the mold while the record is somewhat plastic, the pressure on the surface of the record in contact with the mold being the greater, whereby the record will be forced away from the surface of the mold, substantially as described.

2. The process of extracting phonograph records from a mold consisting in lessening for a suitable time interval the pressure upon that surface of the record in the mold which is not in contact with the record surface of the mold, while the record is somewhat plastic, whereby the record will be slightly detached from the record surface of the mold, and in permitting a fluid under atmospheric or increased pressure to then pass between the mold surface and the surface of the record adjacent thereto, to cause the record to be further detached from the mold, to a sufficient extent to allow the ready removal of the record from the mold, substantially as described.

3. The process of removing a cast from its matrix consisting in creating for a suitable time interval a difference in pressure between the two surfaces of the cast in the matrix while the cast is somewhat plastic, the pressure on the surface of the cast in contact with the mold being the greater, whereby the cast will be withdrawn from the surface of the matrix by the application of the forces having the said pressures, substantially as described.

4. The process of removing a cast from its matrix consisting in lessening for a suitable time interval the pressure upon that surface of the cast in the mold which is not in contact with the surface of the mold, while the cast is somewhat plastic, whereby the cast will be slightly detached from the surface of the mold, and in permitting a fluid under atmospheric or increased pressure to then pass between the mold surface and the surface of the cast adjacent thereto, to cause the cast to be further detached from the mold to a sufficient extent to allow the ready removal of the cast from the mold, substantially as described.

5. The process of removing a cast from its matrix consisting in lessening for a suitable time interval the pressure upon that surface of the cast in the mold which is not in contact with the surface of the mold, while the cast is somewhat plastic, whereby the cast will be detached from the mold surface to a sufficient extent to allow its removal, substantially as described.

6. The process of removing a cast from its matrix, consisting in the application of a force to the cast in the matrix, while the cast is in a somewhat plastic condition, to slightly detach at one edge the cast from the surface of the matrix to which it adheres, and to then admit fluid between the surface of the matrix and the surface of the cast at such edge, such fluid being under a pressure in excess of that acting on the surface of the cast more distant from the mold surface, whereby the cast will be stripped from the matrix, substantially as described.

7. The process of removing a cast from its matrix consisting in the application of an unbalanced uniform force to one surface of the cast, while in a somewhat plastic condition in the matrix, whereby the cast will be uniformly detached from the surface of the matrix, substantially as described.

8. The process of removing a cast from a curved matrix with which it interlocks, consisting in the application of an unbalanced uniform force to one surface of the cast while in a somewhat plastic condition in the matrix, whereby the cast will be uniformly detached from the interlocking surface of the matrix, the elements of the cast being constrained to take up new positions by virtue of the application of said force, and the surfaces of the cast in their new positions being everywhere parallel to the same in their positions before removal, substantially as described.

9. The process of extracting hollow cylindrical phonograph records from a concentric mold consisting in the application of an unbalanced uniform force to one surface of the record while in a somewhat plastic condition in the mold, whereby the record will be uniformly and radially detached from the interlocking surface of the mold, and in the removal of the record from the mold by direct longitudinal movement, substantially as described.

10. The process of producing hollow cylindrical phonograms, which consists in forming a hollow cylindrical plastic phonogram within a hollow cylindrical mold, releasing the phonogram from the mold by applying an unbalanced uniform radial force to one surface of the phonogram to effect a radial removal of the phonogram from the mold surface sufficient to clear the same, and removing the phonogram from the mold by direct longitudinal movement, substantially as described.

11. The process of extracting hollow cylindrical phonograms from a surrounding concentric mold, consisting in producing a partial vacuum within the bore of the phonogram while the latter is in a somewhat plastic condition in the mold for a sufficient length of time to entirely detach the phonogram from the mold by a bodily removal of the elements of the phonogram inward, and then removing the phonogram from the mold by direct longitudinal movement, substantially as described.

12. The process of extracting hollow cylindrical phonograms from a surrounding concentric mold consisting in producing a partial vacuum within the bore of the phonogram while the latter is in a somewhat plastic condition in the mold, and admitting fluid under pressure within the annular space between the bore of the mold and the periphery of the phonogram caused by the production of such vacuum within the bore of the phonogram for a sufficient length of time to entirely detach the phonogram from the mold by a bodily removal of the elements of the phonogram inward, and then removing the phonogram from the mold by direct longitudinal movement, substantially as described.

13. The process of extracting hollow cylindrical phonograms from a surrounding concentric mold consisting in producing a partial vacuum within the bore of the phonogram while the latter is in a somewhat plastic condition in the mold, and admitting the flow of air within the annular space between the bore of the mold and the periphery of the phonogram caused by the production of such vacuum within the bore of the phonogram for a sufficient length of time to entirely detach the phonogram from the mold by a bodily removal of the elements of the phonogram inward, and then removing the phonogram from the mold by direct longitudinal movement, substantially as described.

14. The process of extracting hollow cylindrical phonograms from a surrounding concentric mold, consisting in producing a partial vacuum within the bore of the phonogram while the latter is in a somewhat plastic condition in the mold, for a sufficient length of time to entirely detach the phonogram from the mold by a bodily removal of the elements of the phonogram inward, and to draw the bore of the phonogram into contact with the periphery of a hollow mandrel which is placed within the same, and in then removing the mandrel and phonogram from the mold by direct longitudinal movement, substantially as described.

15. The process of extracting hollow cylindrical phonograms from a concentric mold consisting of the application of an unbalanced uniform force to one surface of the phonogram while the latter is in a somewhat plastic condition in the mold, for a sufficient length of time to entirely detach the phonogram from the mold by bodily removal of the elements of the phonogram inward, and to draw the bore of the phonogram into contact with the periphery of a hollow mandrel which is placed within the same, and in then removing the mandrel and phonogram from the mold by direct longitudinal movement, substantially as described.

16. The process of extracting hollow cylindrical phonograms from a surrounding concentric mold, consisting in producing a partial vacuum within the bore of the phonogram while the latter is in a somewhat plastic condition in the mold to produce an annular space between the bore of the mold and the periphery of the phonogram, admitting the flow of air within the said annular space for a sufficient length of time to entirely detach the phonogram from the mold by a bodily removal of the elements of the phonogram inward and to cause the phonogram to engage the periphery of a hollow mandrel which is placed within the same, and in then removing the mandrel and the phonogram from the mold by direct longitudinal movement, substantially as described.

This specification signed and witnessed this 30th day of March 1909.

JONAS W. AYLSWORTH.

Witnesses:
DYER SMITH,
JOHN M. CANFIELD.

Copies of this patent may be obtained for five cents each, by addressing the "Commissioner of Patents, Washington, D. C."